United States Patent Office 2,864,717
Patented Dec. 16, 1958

2,864,717

WORKABILITY OF CLAY SOILS

John W. Lyons, Reading, Mass., assignor to Monsanto Chemical Company, St. Louis, Mo., a corporation of Delaware No Drawing. Application April 15, 1957
Serial No. 652,649

19 Claims. (Cl. 106—287)

This invention relates to an improved procedure for increasing the workability of clay soils and to the improved clay soil obtained thereby. More specifically this invention relates to an improved process for increasing the workability of clay soils wherein the said soils are treated with a minor amount of a condensation product of a saturated aliphatic alcohol, i. e. an alkanol, with a plurality of moles of ethylene oxide.

A major problem in the construction industry relating to soil engineering has been providing a suitable means of incorporating modifying chemicals into clay-containing soils. For example, soil-cement compositions have been widely employed in the construction of highway subgrade, but have not been generally successful with highly plastic soils. It generally has been found that the higher the plastic index of the clay-containing soils, the more difficult it is to intimately mix the cement with the clay soil. This is also generally true with various other materials which may be added to soils to modify the physical characteristics thereof.

The principal object of this invention is to provide a means of substantially improving the workability of clay-containing soils. Another object of this invention is to provide a means of decreasing the plastic index of clay-containing soils. Still another object of this invention is to provide a means of effecting the mixing of materials into wet clay-containing soils at a net power reduction in the mixing operation and effecting a more homogeneous mixture in a shorter time. Other objects will be apparent from the following disclosure.

It has now been found that the addition of from about 0.05 to about 2 percent and preferably from about 0.1 to about 1 percent by weight, based on the dry weight of the soil, of a condensation product of a saturated aliphatic alcohol with a plurality of moles of ethylene oxide, as hereinafter more fully defined, to clay-containing soils effects a reduction in the plastic index of the clay-containing soil, thereby rendering the clay-containing soil workable over a wider range of moisture content, and provides a clay soil wherein chemical modifiers can be readily mixed into the soil to effect a substantially uniform distribution therein and the mixing operation is effected at a lower net power consumption.

The condensation products of alkanols with a plurality of moles of ethylene oxide which can be employed in this invention can be defined by the structural formula $RO(CH_2CH_2O)_nH$, wherein R is an alkyl radical containing from 8 to 16 carbon atoms and n is an integer from 2 to 30. Whereas n is an integer in the aforesaid class of condensation products, it should be understood that the said condensation products comprise a blend of products having a varying mole ratio of ethylene oxide to the alkanol, such that the average value of n for a given composition will generally be a mixed number. The various alkanol-ethylene oxide condensates which are useful in the instant invention are generally well known in the prior art. There are numerous patents which disclose various straight- and branched-chain saturated aliphatic monohydric alcohols condensed with ethylene oxide. For example illustrative suitable alkanols are octanol, isooctanol, nonanol, decanol, dodecanol, tridecanol, tetradecanol, hexadecanol, 2-ethylhexanol, 2-n-propylheptanol, 2-butyloctanol, 5-ethylnonanol-2, 2,6,8-trimethylnonanol-4, 7-ethyl-2-methylundecanol-4, and the like. Alkanol-ethylene oxide condensation products derived from the aforesaid and similar alkanols are shown for example in U. S. Patent Nos. 1,970,578; 2,164,431; 2,355,823; 2,617,830; 2,671,115; etc. Alkanols derived from the oxo process containing from about 10 to about 13 carbon atoms condensed with from about 2 to about 15 moles of ethylene oxide, and preferably with from about 2 to about 10 moles of ethylene oxide, comprise the preferred class of condensation products of this invention.

The clay-containing soils which can be benefited by the addition of minor amounts of an alkanol-ethylene oxide condensation product preferably include those soil compositions containing from about 20 to about 70 percent or more of clay in accordance with the well-known triaxial textural classification chart of the U. S. Bureau of Chemistry and Soils. These soils include the various soils classified as clay, sandy clay, silty clay, clay loam, sandy clay loam, and silty clay loam. Various illustrative specific clay-containing soils are for example clay from the Hybla Valley, Virginia; Cecil clay, Houston clay, Lake Charles clay, Capay silty clay loam, and the like.

The workability of the clay-containing soil can be modified by the treatment with the alkanol-ethylene oxide condensation product prior to the addition of other chemical modifiers, such as Portland cement, and this procedure may be preferred with particularly gummy clay soils, or can be added in a single-treatment operation with other materials. In the latter case the treatment of the clay-containing soil can be readily effected by the addition of a calculated amount of the aforesaid condensation product, or an aqueous solution thereof, and the other chemical modifiers in finely divided solid or liquid form, depending on the depth of soil to be treated and the moisture content of said soil, by application with a P and H Single-Pass Soil Stabilizer, Seaman Pulvi-mixer, or similar apparatus, or by application of the said materials and any necessary additional amount of water, to provide the optimum moisture conditions for compaction of the particular soil being treated, to the soil surface by other suitable means and mixing with various traveling pug mills, roto-tillers and the like. Normally it is desirable to treat the soil to a compacted depth of at least about 6 inches to provide a well-stabilized subgrade. After the treatment of the clay-containing soil with the desired amount of the alkanolethylene oxide condensation product and stabilizer materials it is compacted by the application of a sheepsfoot roller and thereafter leveled and further compacted by pneumatic-tired rollers and then with smooth rollers if desired. Thereafter the treated soil is generally covered with a light coating of bituminous material by spray application or other suitable means to prevent substantial loss of moisture therefrom during curing. Then a suitable subbase and topping can be applied thereover or the topping can be applied directly to the stabilized subgrade as desired.

The plastic index of a soil is defined as the range of moisture content over which the soil is plastic and is expressed as the difference between the moisture content of the soil at the liquid limit minus the moisture content of the soil at the plastic limit. It will be seen from the following examples that the alkanol-ethylene oxide condensation products effect a reduction in the plastic index and generally increase the plastic limit of the soil whereby it is apparent that the treated soil can be worked over a correspondingly greater moisture content.

The following examples are illustrative of the instant invention.

*Example 1*

A sample of clay from the Hybla Valley in Virginia containing 33 percent clay, 24 percent silt, and 43 percent sand was employed to demonstrate the beneficial effect of the presence of the nonionic alkanol-ethylene oxide condensation products on the Atterberg limits of the said soil. In each instance 2 weight percent, based on the dry weight of the soil, of the indicated alkanol-ethylene oxide condensation product was employed. The evaluation of these compositions is given in the following table, wherein the terms similar to alkanol-n EO are employed to designate the alcohol employed and the average number of moles of ethylene oxide condensed therewith.

| Alkanol-n EO | Percent | Liquid Limit | Plastic Limit | Plastic Index | Percent PI Change |
|---|---|---|---|---|---|
| Control | 0 | 46 | 22 | 24 | |
| Decanol-4EO | 2 | 45 | 30 | 15 | −37.5 |
| Decanol-5EO | 2 | 44 | 31 | 13 | −45.8 |
| Tridecanol-2EO | 2 | 44 | 29 | 15 | −37.5 |
| Tridecanol-9.2EO | 2 | 44 | 29 | 15 | −37.5 |
| Tridecanol-29.4EO | 2 | 47 | 28 | 19 | −20.8 |

It was also noted that the clay soil compositions containing the above-mentioned alkanol-ethylene oxide condensation products effected a visible and marked reduction in the binding and jamming of a mixer employed to work this soil.

*Example 2*

The clay soil of Example 1 was also modified by the addition thereto of 12 percent of Portland cement and a second portion of said soil was modified with the addition thereto of 12 percent of Portland cement and 2 percent of the condensation product of decanol with 5 moles of ethylene oxide. The soil composition containing the Portland cement alone had a liquid limit of 42, a plastic limit of 27 and a plastic index of 15, whereas the addition of the decanol-5EO condensate effected the further beneficial result of providing a liquid limit of 41, a plastic limit of 33, and a plastic index of 8. The presence of the decanol-5EO condensate provided a system whereby the Portland cement was more easily incorporated into the soil and effected a substantially uniform distribution of the Portland cement therein.

*Example 3*

The effect of the alkanol-ethylene oxide condensation products were also determined with clay soils stabilized with phosphoric acid. It was found for example that the addition of decanol-5EO condensate to the phosphoric acid improved the workability of the treated clay soil. Furthermore when the clay soil of Example 1 was treated with 0.5, 1, 2 and 3.5 percent of phosphoric acid, it was generally found that the addition thereto of about 0.5 percent of decanol-5EO condensate effected an improved unconfined compressive strength of molded cylindrical samples which were cured five days and then immersed in water for two days prior to evaluation. The relative magnitude of the improvement became less as the amount of phosphoric acid in the composition was increased. Also when greater than about 2 percent of the decanol-5EO condensate was present the unconfined compressive strength of the modified soil composition began to fall below the value for the phosphoric acid treated control. Accordingly, where wet compressive strength is a material factor in the use of the modified soil it is preferable that not over 2 percent of the alkanol-ethylene oxide condensation product be employed.

*Example 4*

A relative quantitative test was devised to determine variations in soil workability by measuring the differences in power drawn by a mixer during a fixed period of time, which test was supplemented by visual observation during the mixing procedure. The mixer was allowed to run for a sufficient period to warm up the motor and bearings then the power consumption of the mixer for an 18-minute period was determined. Then sufficient air-dry test soil was added to the mixer to provide 1500 parts by weight of oven-dry (110° C.) soil and the desired quantity of water and/or alkanol-ethylene oxide condensate was quickly added thereto. The mixer was started simultaneously with the addition of the liquid and the power consumption determined for an 18-minute run.

A heavy clay soil identified as Panton clay from Burlington, Vermont, and containing 70 percent clay, 22 percent silt, and 8 percent sand was evaluated in the aforesaid manner at various moisture contents. The percent power reduction was determined with the incorporation therein of about 0.1 percent of the condensation product of decanol and 5 moles of ethylene oxide, i. e. the condensation product of Example 1 which was found to provide about the maximum reduction of the plastic index of the clay soil. The percent power reduction was found to be 16, 35, 40 and 27, respectively at soil moisture contents of 15%, 20%, 24% and 28%.

I claim:

1. A method for the improvement of the workability of clay-containing soils comprising the distribution in clay soils in intimate admixture therewith of from about 0.05 to about 2 weight percent, based on the dry weight of the soil, of an alkanol-ethylene oxide condensation product defined by the structural formula $RO(CH_2CH_2O)_nH$, wherein R is an alkyl radical containing from 8 to 16 carbon atoms and $n$ is a number from 2 to 30.

2. The method of claim 1, wherein from about 0.1 to about 1 percent of the alkanol-ethylene oxide condensation product is employed.

3. The method of claim 1, wherein the alkyl radical contains from about 10 to about 13 carbon atoms and $n$ is a number from about 2 to about 15.

4. The method of claim 3, wherein $n$ is a number from about 2 to about 10.

5. The method of claim 4, wherein the alkanol is decanol and $n$ is about 5.

6. The method of claim 4, wherein the alkanol is tridecanol and $n$ is about 9.

7. The methd of claim 4, wherein the alkanol is tridecanol and $n$ is about 2.

8. A method for the improvement of the workability of clay-containing soils comprising the distribution in clay soils containing from about 20 to about 70 percent clay in intimate admixture therewith of from about 0.05 to about 2 weight percent, based on the dry weight of the soil, of an alkanol-ethylene oxide condensation product defined by the structural formula $RO(CH_2CH_2O)_nH$, wherein R is an alkyl radical containing from 8 to 16 carbon atoms and $n$ is a number from 2 to 30.

9. The method of claim 8, wherein from about 0.1 to about 1 percent of the alkanol-ethylene oxide condensation product is employed.

10. The method of claim 8, wherein the alkyl radical contains from about 10 to about 13 carbon atoms and $n$ is a number from about 2 to about 15.

11. The method of claim 10, wherein $n$ is a number from about 2 to about 10.

12. The method of claim 11, wherein the alkanol is decanol and $n$ is about 5.

13. The method of claim 11, wherein the alkanol is tridecanol and $n$ is about 9.

14. The method of claim 11, wherein the alkanol is tridecanol and $n$ is about 2.

15. Clay-containing soil conditioned with from about 0.05 to about 2 weight percent, based on the dry weight of the soil, of an alkanol-ethylene oxide condensation product defined by the structural formula $$RO(CH_2CH_2O)_nH$$

wherein R is an alkyl radical containing from 8 to 16 carbon atoms and $n$ is a number from 2 to 30.

16. Clay-containing soil conditioned with from about 0.1 to about 1 weight percent, based on the dry weight of the soil, of an alkanol-ethylene oxide condensation product defined by the structural formula $$RO(CH_2CH_2O)_nH$$

wherein R is an alkyl radical containing from 8 to 16 carbon atoms and $n$ is a number from 2 to 30.

17. Clay-containing soil conditioned with from about 0.05 to about 2 weight percent, based on the dry weight of the soil, of a decanol-ethylene oxide condensation product wherein the mole ratio of the ethylene oxide to the decanol is about 5.

18. Clay-containing soil conditioned with from about 0.05 to about 2 weight percent, based on the dry weight of the soil, of a tridecanol-ethylene oxide condensation product wherein the mole ratio of the ethylene oxide to the tridecanol is about 9.

19. Clay-containing soil conditioned with from about 0.05 to about 2 weight percent, based on the dry weight of the soil, of a tridecanol-ethylene oxide condensation product wherein the mole ratio of the ethylene oxide to the tridecanol is about 2.

References Cited in the file of this patent

UNITED STATES PATENTS

| | | |
|---|---|---|
| 2,133,480 | Schoeller | Oct. 18, 1938 |
| 2,614,917 | Zuckel | Oct. 21, 1952 |
| 2,652,379 | Hedrick et al. | Sept. 15, 1953 |
| 2,768,089 | Erickson | Oct. 23, 1956 |